(12) United States Patent
Zimmel et al.

(10) Patent No.: US 12,147,081 B2
(45) Date of Patent: Nov. 19, 2024

(54) FIBER OPTIC CONNECTOR WITH EPOXY TUBE WITH AXIAL FLOAT

(71) Applicant: COMMSCOPE TECHNOLOGIES LLC, Hickory, NC (US)

(72) Inventors: Steven Conrad Zimmel, Minneapolis, MN (US); Gregory J. Schaible, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 151 days.

(21) Appl. No.: 17/627,549

(22) PCT Filed: Jul. 15, 2020

(86) PCT No.: PCT/US2020/042135
§ 371 (c)(1),
(2) Date: Jan. 14, 2022

(87) PCT Pub. No.: WO2021/011651
PCT Pub. Date: Jan. 21, 2021

(65) Prior Publication Data
US 2022/0260788 A1    Aug. 18, 2022

Related U.S. Application Data

(60) Provisional application No. 62/875,342, filed on Jul. 17, 2019.

(51) Int. Cl.
*G02B 6/38*    (2006.01)

(52) U.S. Cl.
CPC ....... *G02B 6/38875* (2021.05); *G02B 6/3871* (2013.01)

(58) Field of Classification Search
CPC ..... G02B 6/38; G02B 6/38875; G02B 6/3871
See application file for complete search history.

(56) References Cited

U.S. PATENT DOCUMENTS

| 5,058,984 A | 10/1991 | Bulman et al. |
| 5,096,276 A | 3/1992 | Gerace et al. |
| 5,181,267 A | 1/1993 | Gerace et al. |
| (Continued) | | |

FOREIGN PATENT DOCUMENTS

| CN | 101091131 A | 12/2007 |
| CN | 104169764 A | 11/2014 |
| (Continued) | | |

OTHER PUBLICATIONS

Extended European Search Report for Application No. 20841353.4 mailed Jul. 14, 2023.

(Continued)

*Primary Examiner* — Tina M Wong
(74) *Attorney, Agent, or Firm* — Merchant & Gould P.C.

(57) ABSTRACT

The present disclosure relates to an epoxy tube for an optical fiber connector. The tube can be mounted to a ferrule hub by a snap fit connection. The connection between the tube and the ferrule hub allows for float of the epoxy tube where the epoxy tube is not rigidly attached to the hub. The epoxy tube can be configured to move about an arc of rotational circular movement while remaining linear such that the epoxy tube does not bend or transfer forces to the hub.

15 Claims, 18 Drawing Sheets

(56) References Cited

U.S. PATENT DOCUMENTS

| | | | |
|---|---|---|---|
| 5,317,663 A | 5/1994 | Beard et al. | |
| 5,375,183 A | 12/1994 | Edwards et al. | |
| 5,428,703 A | 6/1995 | Lee | |
| 5,611,012 A | 3/1997 | Kuchenbecker | |
| 5,682,451 A * | 10/1997 | Lee .................... | G02B 6/3869 |
| | | | 385/60 |
| 5,778,126 A | 7/1998 | Saitoh | |
| 6,142,676 A | 11/2000 | Lu | |
| 6,155,146 A | 12/2000 | Andrews et al. | |
| 6,629,782 B2 | 10/2003 | McPhee et al. | |
| 7,281,859 B2 | 10/2007 | Mudd et al. | |
| 7,997,806 B2 | 8/2011 | Nakagawa | |
| 8,496,386 B2 | 7/2013 | Kerr et al. | |
| 8,858,090 B2 | 10/2014 | Henke et al. | |
| 9,057,849 B2 | 6/2015 | Park et al. | |
| 9,684,138 B2 | 6/2017 | Lu | |
| 11,150,412 B2 | 10/2021 | Zimmel et al. | |
| 11,187,859 B2 | 11/2021 | Rosson et al. | |
| 2002/0081077 A1 | 6/2002 | Nault | |
| 2003/0147598 A1 | 8/2003 | McPhee et al. | |
| 2004/0151437 A1 | 8/2004 | Marrs et al. | |
| 2005/0232553 A1 | 10/2005 | Holmquist | |
| 2005/0232554 A1 | 10/2005 | Zimmel et al. | |
| 2006/0115219 A1 | 6/2006 | Mudd et al. | |
| 2007/0183721 A1 | 8/2007 | Holmquist et al. | |
| 2009/0214164 A1 | 8/2009 | Nakagawa | |
| 2011/0008003 A1 | 1/2011 | Tamekuni et al. | |
| 2011/0075972 A1 | 3/2011 | Parkman, III | |
| 2013/0089294 A1 | 4/2013 | Zimmel | |
| 2013/0315541 A1 | 11/2013 | Nhep et al. | |
| 2013/0322826 A1 | 12/2013 | Henke et al. | |
| 2017/0293090 A1 * | 10/2017 | Hopper ................ | G02B 6/3879 |
| 2018/0059334 A1 | 3/2018 | Lu et al. | |
| 2018/0224608 A1 | 8/2018 | Liu et al. | |
| 2022/0269014 A1 | 8/2022 | Holmquist et al. | |
| 2022/0276451 A1 | 9/2022 | Zimmel et al. | |
| 2022/0357523 A1 | 11/2022 | Zimmel et al. | |

FOREIGN PATENT DOCUMENTS

| | | |
|---|---|---|
| CN | 109716194 A | 5/2019 |
| WO | 2014/031556 A1 | 2/2014 |

OTHER PUBLICATIONS

Partial Supplementary European Search Report for Application No. 20840593.6 mailed Jul. 4, 2023.

Extended European Search Report for Application No. 20840593.6 mailed Oct. 9, 2023.

International Search Report and Written Opinion of the International Searching Authority for International Patent Application No. PCT/US2020/041955 mailed Nov. 5, 2020, 14 pages.

International International Search Report and Written Opinion of the International Searching Authority for International Patent Application No. PCT/US2020/42152 mailed Nov. 6, 2020, 9 pages.

International International Search Report and Written Opinion of the International Searching Authority for International Patent Application No. PCT/US2020/042368 mailed Nov. 5, 2020, 10 pages.

International International Search Report and Written Opinion of the International Searching Authority for International Patent Application No. PCT/US2020/042135 mailed Nov. 5, 2020, 9 pages.

* cited by examiner

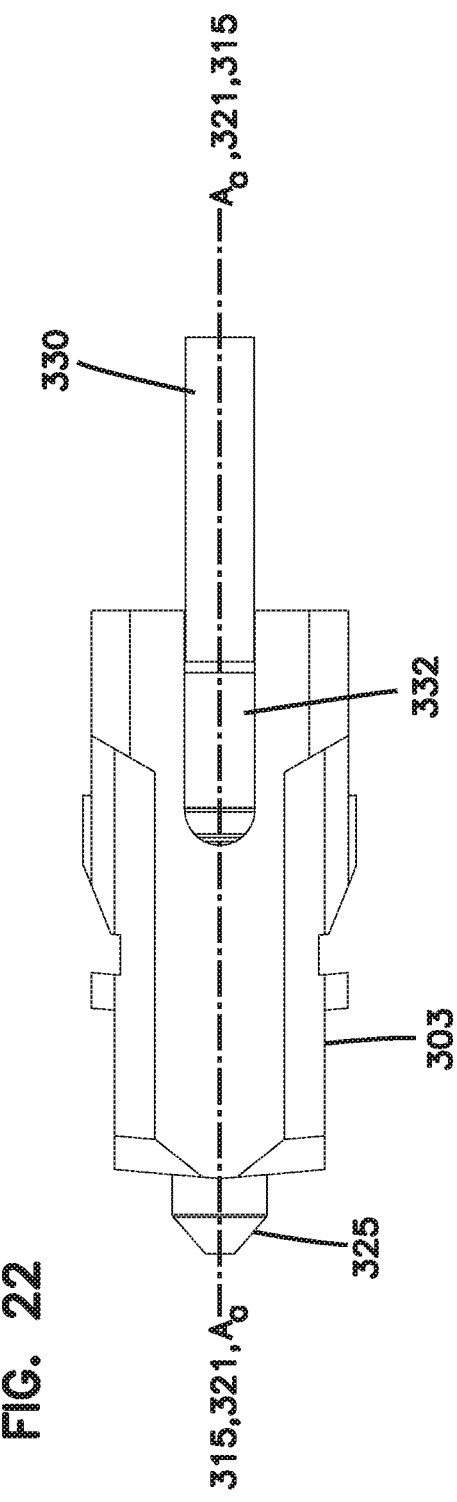
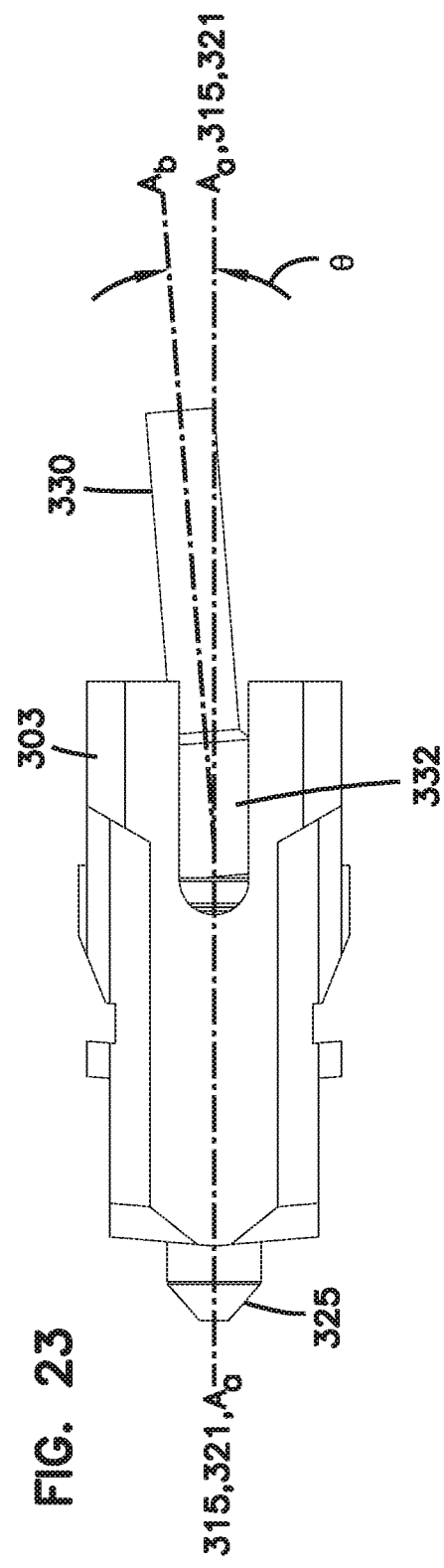

FIBER OPTIC CONNECTOR WITH EPOXY TUBE WITH AXIAL FLOAT

CROSS-REFERENCE TO RELATED APPLICATION

This application is a National Stage Application of PCT/US2020/042135, filed on Jul. 15, 2020, which claims the benefit of U.S. Patent Application Ser. No. 62/875,342, filed on Jul. 17, 2019, the disclosures of which are incorporated herein by reference in their entireties. To the extent appropriate, a claim of priority is made to each of the above disclosed applications.

TECHNICAL FIELD

The present disclosure relates to fiber optic connector assemblies, and more particularly to fiber optic connector assemblies for establishing fiber optic connections.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Epoxy tubes may be used in fiber optic connectors to help with epoxy and fiber insertion. Improvements are desirable with respect to the design of epoxy tubes.

SUMMARY

Aspects of the present disclosure relate to a fiber optic connector assembly that includes a ferrule assembly that has a ferrule and a hub. The ferrule can have a distal end and a proximal end where the proximal end of the ferrule is mounted to a front end of the hub. The ferrule defines a fiber passage that is concentric with a central axis of the ferrule. The fiber passage can extend through the ferrule from the proximal end to the distal end. The fiber optic connector assembly can also include a tube that has a first end and a second end. The tube defines a tube axis that is linear and the tube axis aligns with the central axis of the ferrule. The first end of the tube can mount externally to a rear end of the hub to define an interface. The tube is configured to move about an arc of rotational circular motion. The arc of rotational circular motion can move through an angle of at least 5 degrees relative to the central axis while allowing the tube axis of the tube to remain linear from the first end of the tube to the second of the tube.

Another aspect of the present disclosure relates to a fiber optic connector and cable assembly. The fiber optic connector can have a connector body and a boot. The boot has a distal end portion that is coupled to a proximal end portion of the connector body. The fiber optic connector includes a fiber optic cable that includes an optical fiber and an outer jacket that surrounds the optical fiber, and a tensile reinforcing structure that provides tensile reinforcement to the fiber optic cable. The optical fiber can extend through the boot towards the connector body and the tensile reinforcing structure can be anchored relative to the boot. The fiber optic connector includes a ferrule assembly that includes a ferrule and a hub. The ferrule can have a distal end and a proximal end where the proximal end of the ferrule can be mounted to a front end of the hub. The ferrule can define a fiber passage that is concentric with a central axis of the ferrule. The fiber passage can extend through the ferrule from the proximal end to the distal end. The fiber optic connector includes a tube that has a first end and a second end. The tube defines a tube axis that is linear and concentric with the central axis of the ferrule. The first end of the tube can be mounted externally to a rear end of the hub to define an interface. The tube is configured to move about an arc of rotational circular motion. The arc of rotational circular motion can move through an angle of at least 5 degrees relative to the central axis while allowing the tube axis of the tube to remain liner from the first end of the tube to the second of the tube.

A further aspect of the present disclosure relates to a fiber optic connector assembly that includes a ferrule assembly. The ferrule assembly includes a ferrule and a hub. The ferrule has a distal end and a proximal end where the proximal end of the ferrule can be mounted to a front end of the hub. The ferrule can define a fiber passage that is concentric with a central axis of the ferrule. The fiber passage can extend through the ferrule from the proximal end to the distal end. The fiber optic connector assembly includes a tube that has a first end and a second end. The tube defines a tube axis that is linear and aligns with the central axis of the ferrule. The first end of the tube can be mounted externally to a rear end of the hub to define an interface. The tube can be configured to move about an arc of rotational circular movement relative to the central axis while allowing the tube axis of the tube to remain linear from the first end of the tube to the second of the tube.

DESCRIPTION OF THE DRAWINGS

The accompanying drawings, which are incorporated in and constitute a part of the description, illustrate several aspects of the present disclosure. A brief description of the drawings is as follows:

FIG. 22 is a top view of the fiber optic connector shown in FIG. 20 with an outer key member removed.

FIG. 23 is a top view of the fiber optic connector shown in FIG. 22 depicting an epoxy tube moving about an arc of rotational circular movement in accordance with the principles of the present disclosure.

DETAILED DESCRIPTION

The present disclosure is directed to systems and methods for manufacturing and tuning fiber optic connectors.

Figure 1:
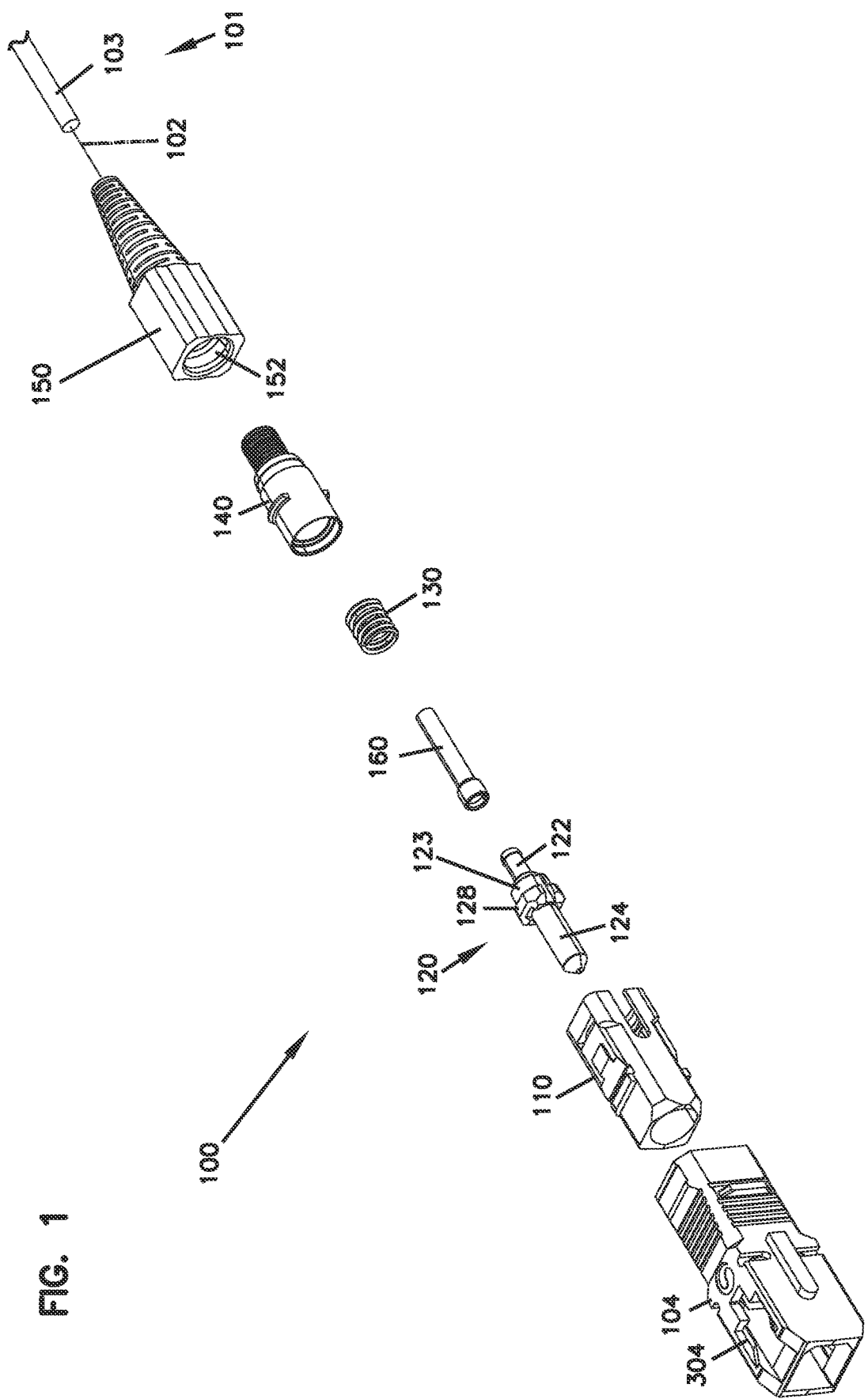
FIG. 1 is an exploded view of an example embodiment of a fiber optic connector made in accordance with the present disclosure.

FIG. 1 is an exploded view of an example connector 100 illustrating components made in accordance with the present disclosure.

The connector 100 includes an outer key member 104, a front housing 110, a rear housing 140, and a boot 150 with a bore 152. Also included is a hub/ferrule assembly 120 with a hub 122 and a ferrule 124. The hub 122 includes an anti-rotation portion 128 and a cylindrical rear portion 123. The hub 122 is connected to the ferrule 124, such as with adhesive or with an interference fit. A spring 130 is also provided. A fiber optic cable 101 is shown including a fiber 102 and a jacket 103. The cable 101 is of the type without reinforcing strength members.

Also shown is a hub extension member 160 that is coupled to the hub 122 and extends rearwardly towards the boot 150. As described further below, the hub extension member 160 maintains the connector 100 in a tuned state upon full assembly of the connector 100.

Figure 2:
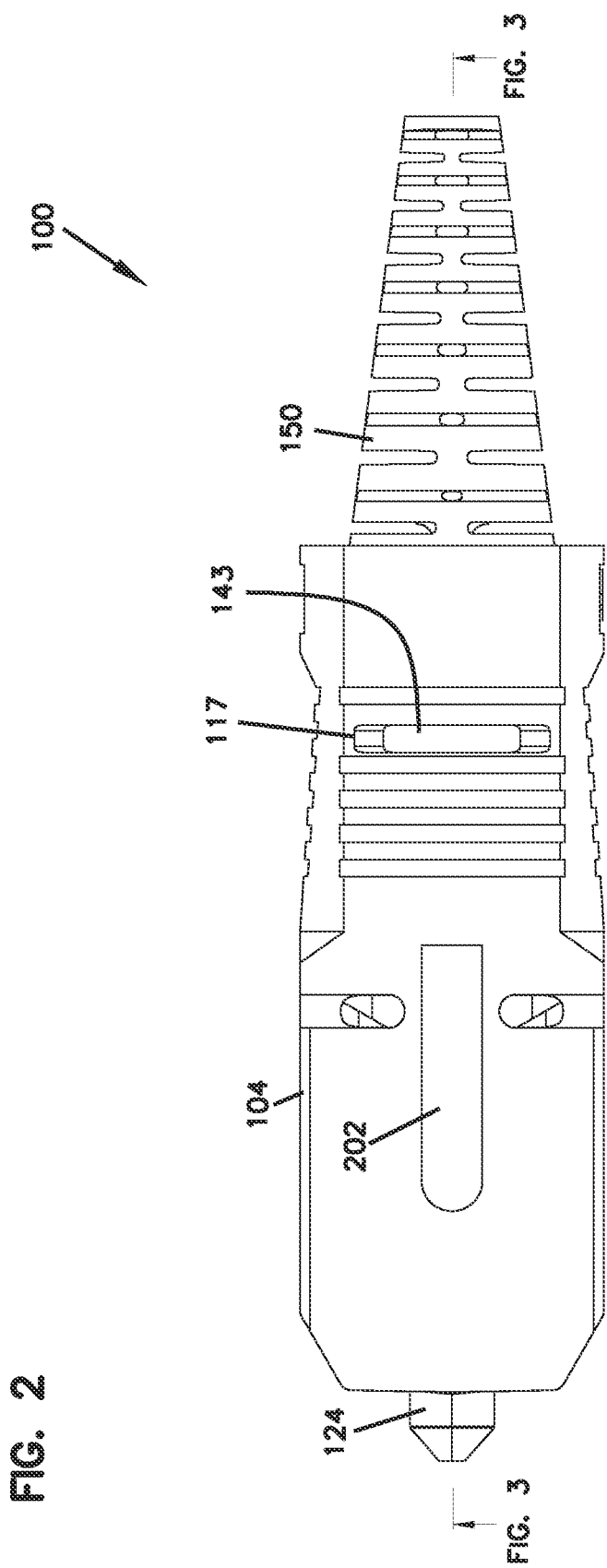
FIG. 2 is a side view of the connector of FIG. 1 in a fully assembled state.
Figure 3:
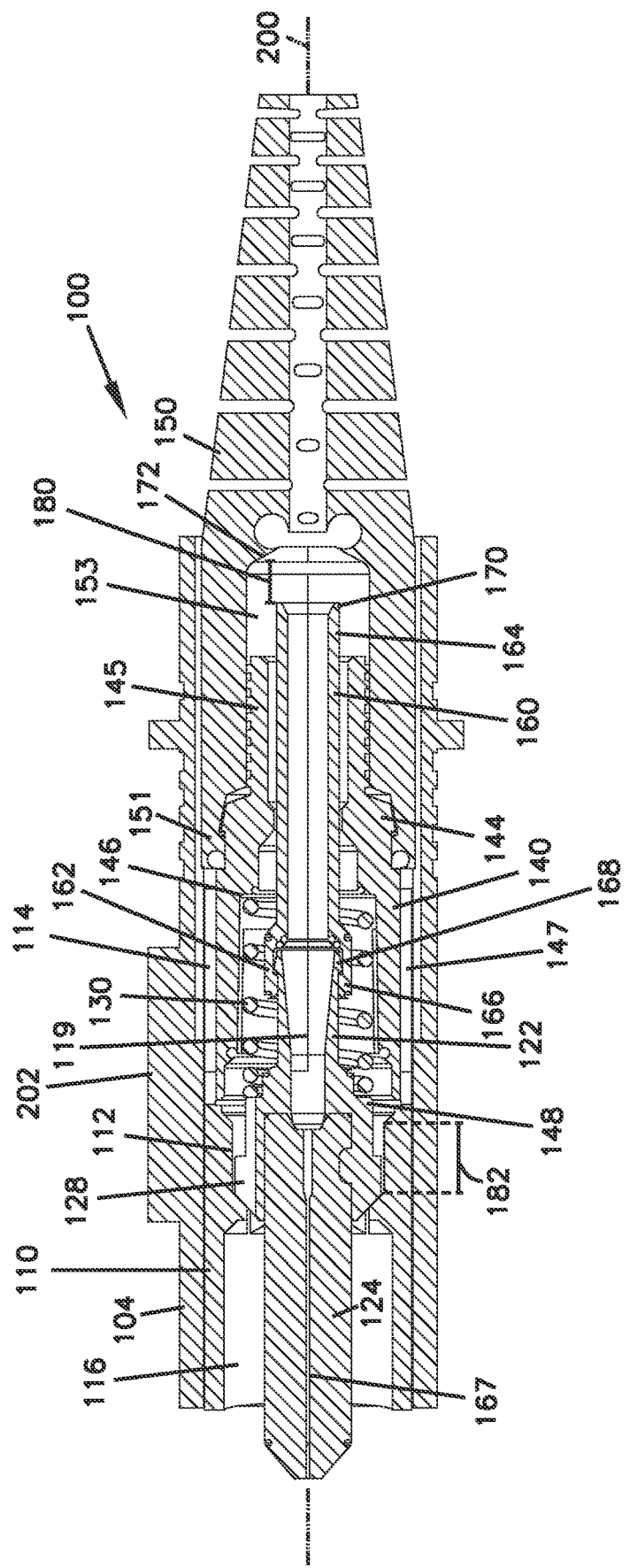
FIG. 3 is a cross-sectional view of the connector shown in FIG. 2.

Referring to FIGS. 2 and 3, the connector 100 is shown in a fully assembled state. The key member 104 includes a key 202 that defines the tuned position for the connector 100.

The front housing 110 of the connector 100 extends along a longitudinal axis 200 and defines an anti-rotation seat 112 and a cavity 114. The ferrule 124 extends through a front bore 116 of the front housing 110 and includes a passage 167. The anti-rotation portion 128 of the hub 122 is slidingly engaged along the longitudinal axis 200 in the anti-rotation seat 112.

Figure 4:
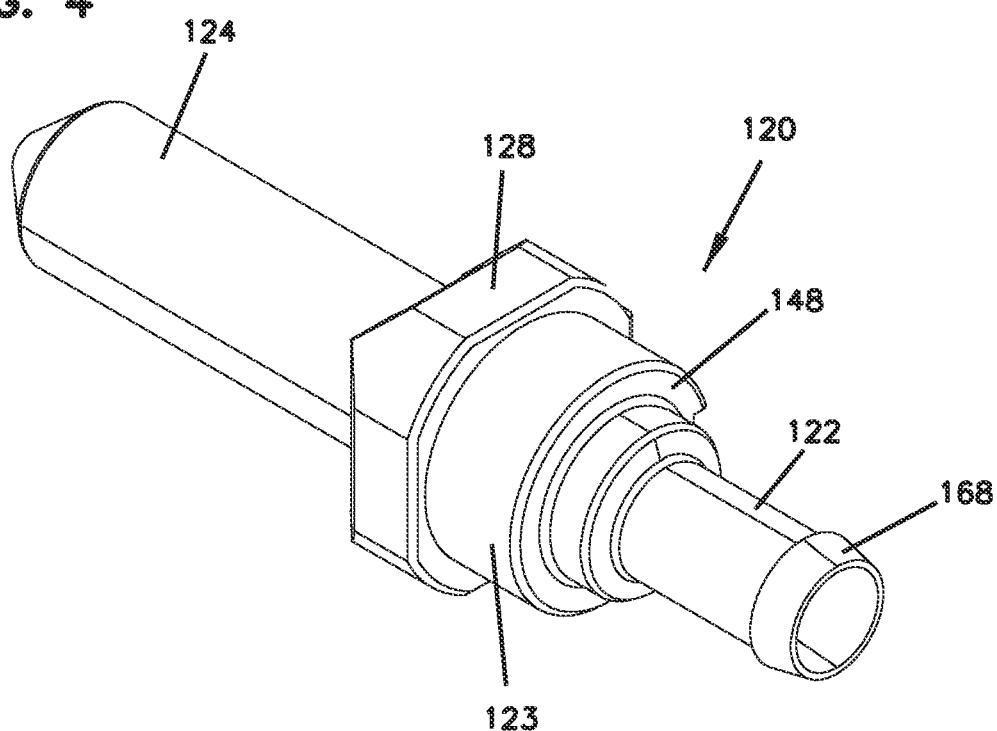
FIG. 4 is a perspective view of an example hub/ferrule assembly of the connector shown in FIG. 1.
Figure 5:
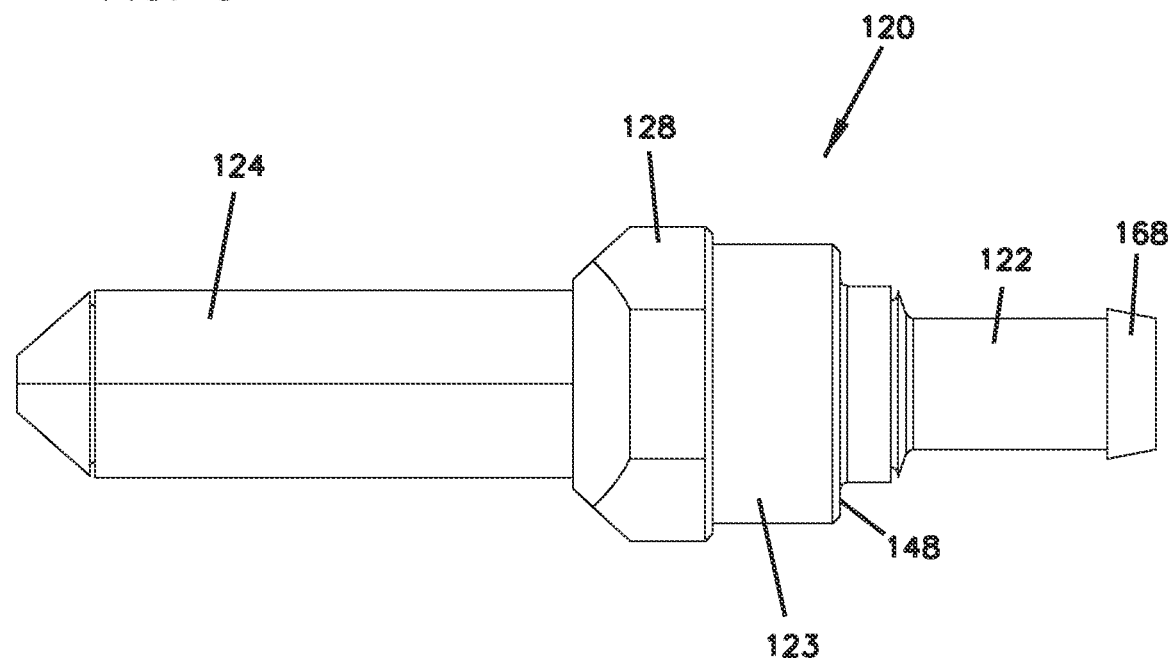
FIG. 5 is a side view of the hub/ferrule assembly shown in FIG. 4.
Figure 6:
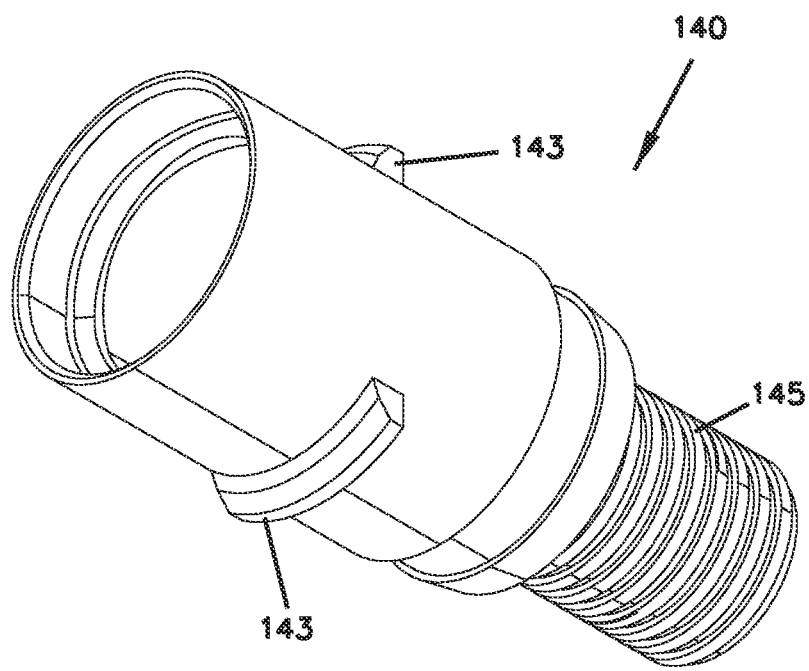
FIG. 6 is perspective view of an example rear housing of the connector shown in FIG. 1.
Figure 7:
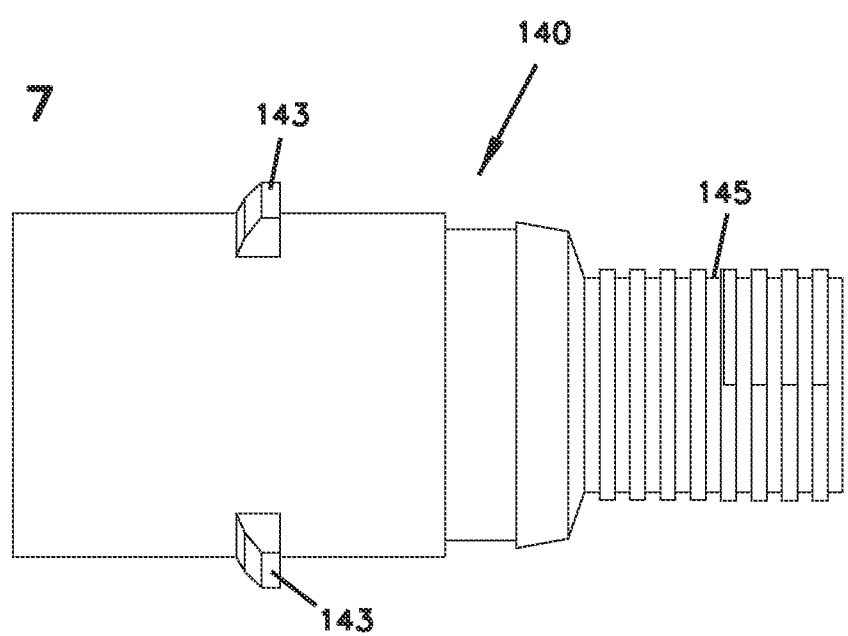
FIG. 7 is a side view of the rear housing shown in FIG. 6.
Figure 8:
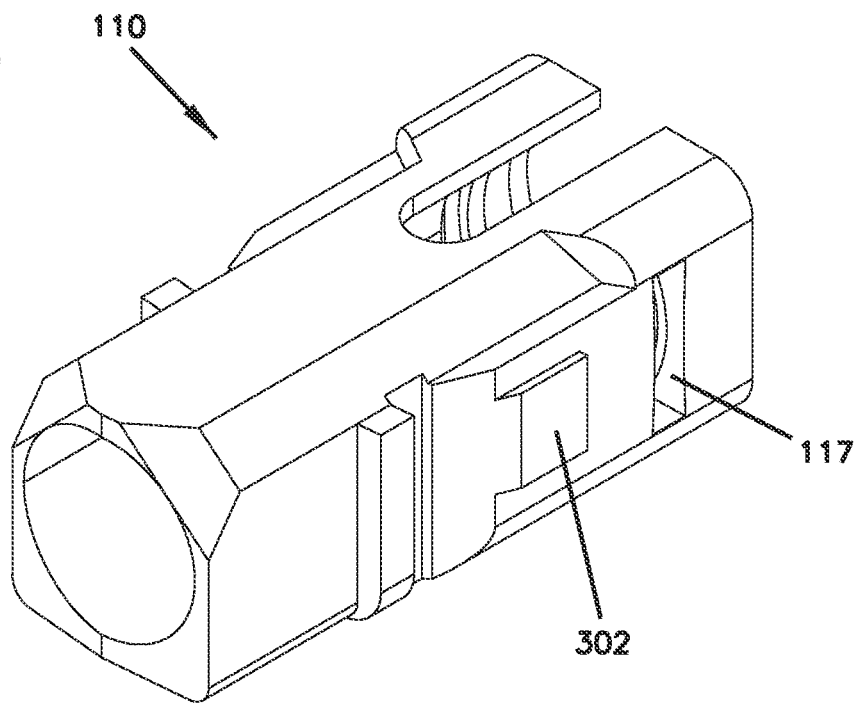
FIG. 8 is perspective view of an example front housing of the connector shown in FIG. 1.
Figure 9:
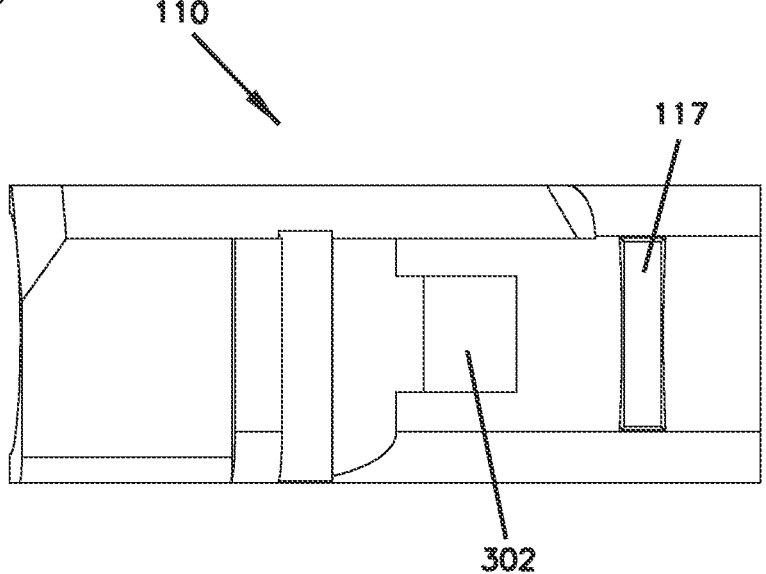
FIG. 9 is a side view of the front housing shown in FIG. 8.

In the example embodiment, the anti-rotation portion 128 is shaped in an octagonal configuration (see FIGS. 4-5) and the anti-rotation seat 112 defines a seat of a complementary geometry. The anti-rotation portion 128 and the anti-rotation seat 112 allow for sliding along the longitudinal axis 200, but prevent relative rotation. Other mating shapes and configurations are also possible. The elongated cylindrical rear portion 123 of the hub 122 extends into the cavity 114 of the front housing 110. The hub 122 includes a passage 119 extending along the longitudinal axis 200.

The spring 130 surrounds the hub 122. The spring 130 is captured between a surface 148 of the anti-rotation portion 128 and a surface 146 of the rear housing 140. The spring 130 functions to bias the anti-rotation portion 128 of the hub 122 into the anti-rotation seat 112 of the front housing 110. Because the ferrule 124 is connected to the hub 122, the spring 130 also functions to bias the ferrule 124 in a forward direction through the front bore 116.

Figure 10:
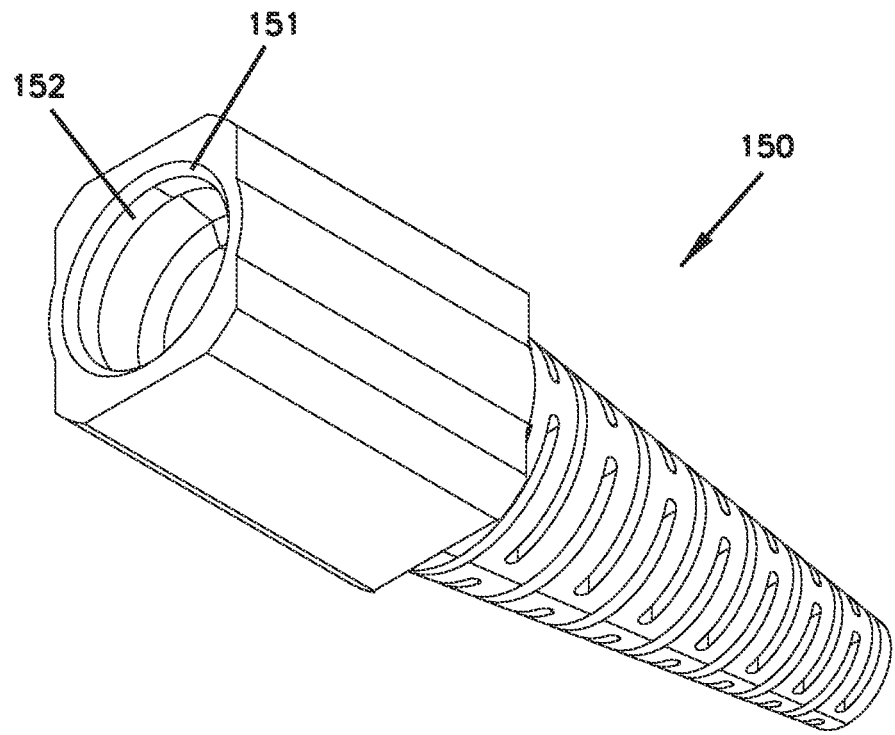
FIG. 10 is perspective view of an example boot of the connector shown in FIG. 1.
Figure 11:
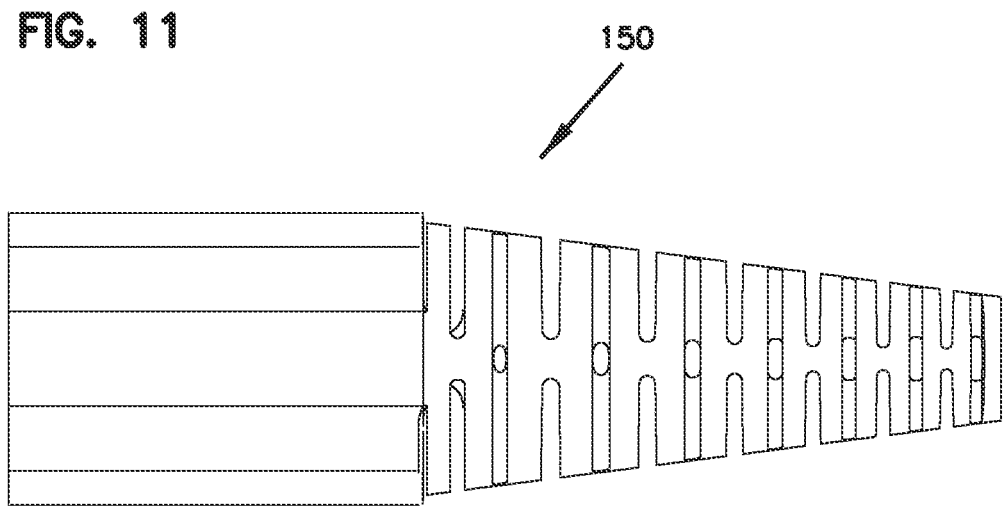
FIG. 11 is a side view of the boot shown in FIG. 10.

Outer protrusions 143 of the rear housing 140 are held engagingly in openings 117 formed by the front housing 110. See FIGS. 6-9. In the fully-assembled state as shown, the rear housing 140 includes a passage 147. A rear portion 145 of the rear housing 140 extends along the longitudinal axis 200 into the bore 152 of the boot 150. See FIGS. 10-11. An arm 151 of the boot 150 extend over tabs 144 formed by the rear portion 145 to hold the rear housing 140 to the boot 150. A passage 153 extending through the boot 150 is coaxially aligned with passage 147 of the rear housing 140 and passage 119 of the hub 122. The passage 119, in turn, is coaxially aligned with the passage 167 of the ferrule 124 and is sized to receive a bare fiber of a fiber optic cable.

Figure 12:
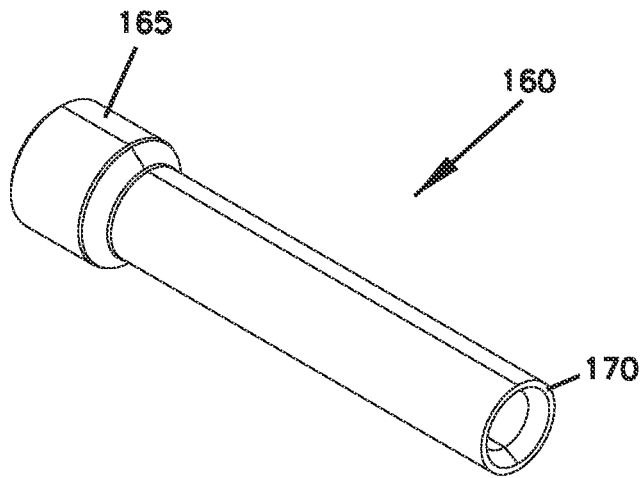
FIG. 12 is perspective view of a hub extension member of the connector shown in FIG. 1.
Figure 13:
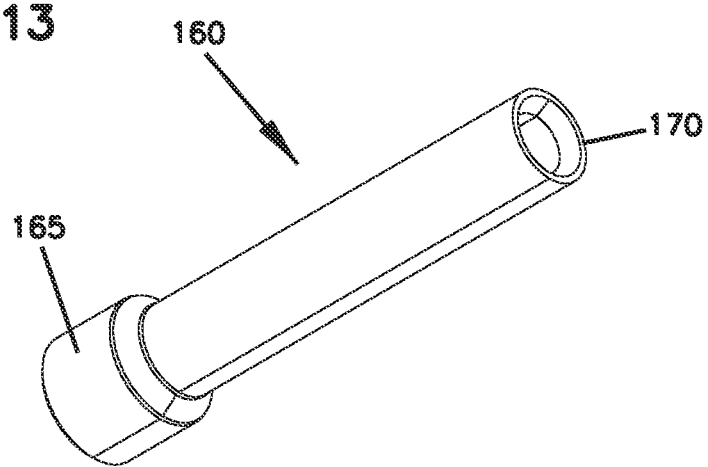
FIG. 13 is another perspective view of the hub extension member shown in FIG. 12.
Figure 14:
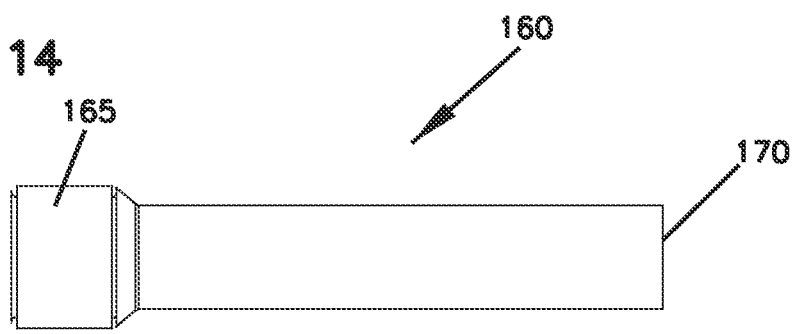
FIG. 14 is a side view of the hub extension member shown in FIG. 12.

An enlarged front portion 165 of the hub extension member 160 (see FIGS. 12-14) includes an arm 166 to engage tabs 168 of the hub 122 to couple the hub extension member 160 to the hub 122. The hub extension member 160 extends rearwardly into the passage 153 formed by the boot 150. An end 170 of the hub extension member 160 is positioned relative to a surface 172 of the boot 150 so that, in the fully assembled state as depicted, the end 170 contacts the surface 172 of the boot 150 and limits further rearward travel of the hub 122 before the anti-rotation portion 128 clears the anti-rotation seat 112, so that the connector 100 cannot become un-tuned. In other words, a distance 180 from the end 170 to the surface 172 is smaller than the distance 182 required to remove the anti-rotation portion 128 from the anti-rotation seat 112. See FIGS. 1 and 15.

The cable 101, not shown in FIGS. 2-3, is extended through the passages 153 and 147, and the fiber 102 is extended through passages 119 and 167 and is glued to the ferrule 124. The jacket 103 extends through passage 119 and can abut the ferrule 124. The jacket 103 is glued to the hub 122.

The connector 100 can be assembled and tuned as follows. The hub 122 and ferrule 124 are inserted into the front housing 110 so that the anti-rotation portion 128 of the hub 122 sits in the anti-rotation seat 112 of the front housing 110. The rear housing 140 is then slid into the front housing 110 until the outer protrusions 143 of the rear housing 140 are held engagingly in openings 117 formed by the front housing 110 to form an integral unit. In other words, the front and rear housings 110, 140 are fully connected to each other. The front and rear housings 110 and 140 can be pressed together in any convenient manner, such as with a press or clamping tool. This forms a semi-assembled state without the boot 150.

Figure 16:
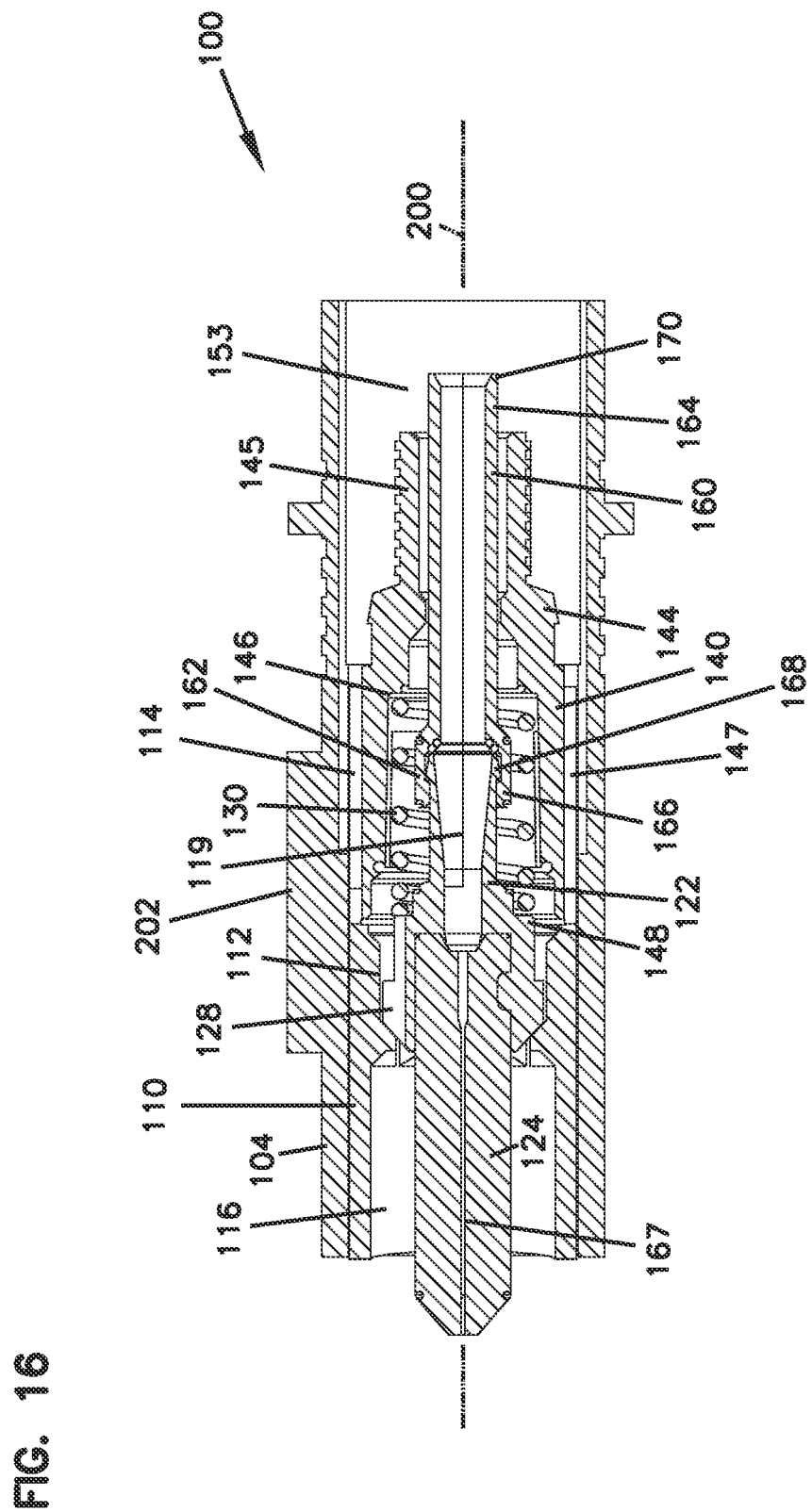
FIG. 16 is a cross-sectional view of the front and rear housings of the connector shown in FIG. 1 in a semi-assembled state.
Figure 17:
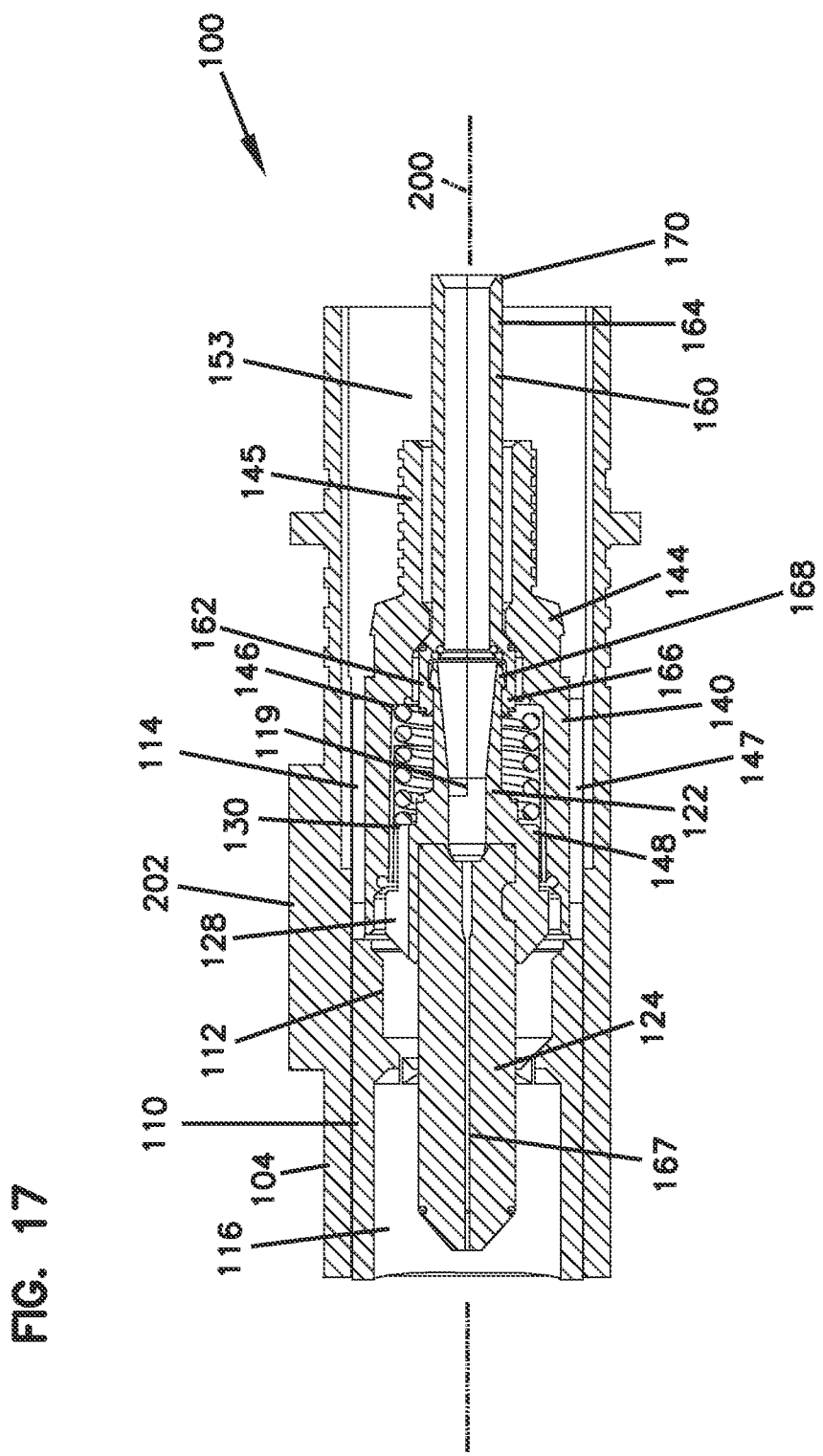
FIG. 17 is another cross-sectional view of the front and rear housings shown in FIG. 16 with the hub/ferrule assembly pressed rearwardly.

In this semi-assembled state shown in FIG. 16, the ferrule 124 and the hub 122 can be pushed back against the biasing force of the spring 130 along the longitudinal axis 200 towards the rear housing 140 so that the anti-rotation portion 128 of the hub 122 enters the cavity 114 and completely clears the anti-rotation seat 112. This can be accomplished because the boot 150 has not yet been coupled to the rear housing 140. In this position, because the anti-rotation portion 128 of the hub 122 is no longer engaged in the anti-rotation seat 112 of the front housing 110, the ferrule 124 and the hub 122 can be rotated about the longitudinal axis 200 to tune the connector 100 as desired. See FIG. 17. Tuning can thereupon be performed to determine the desired tuned position. Tuning can be by any method useful to determine the desired orientation of the ferrule 124 in the connector 100.

Once tuning is completed, the hub/ferrule assembly 120 is released so that the anti-rotation portion 128 of the hub 122 again sits in the anti-rotation seat 112 of the front housing 110 to limit rotation of the hub/ferrule assembly 120 and thereby maintain the tuned position.

After tuning is completed, the boot 150 is moved longitudinally along the axis 200 so that rear housing 140 is received in the bore 152 and extends into the passage 153. The arms 151 of the boot 150 extend over tabs 144 formed by the rear portion 145 to couple the rear housing 140 to the boot 150.

Prior to or after tuning, the outer key member 104 is oriented relative to the front housing 110, and the outer key member 104 is slid onto the front housing 110 until a tab 302 is received in an opening 304 of the outer key member 104. See FIGS. 1 and 8-9. In this fully-assembled state, the key 202 indicates the tuned position when the connector 100 is coupled to another connector.

Figure 15:
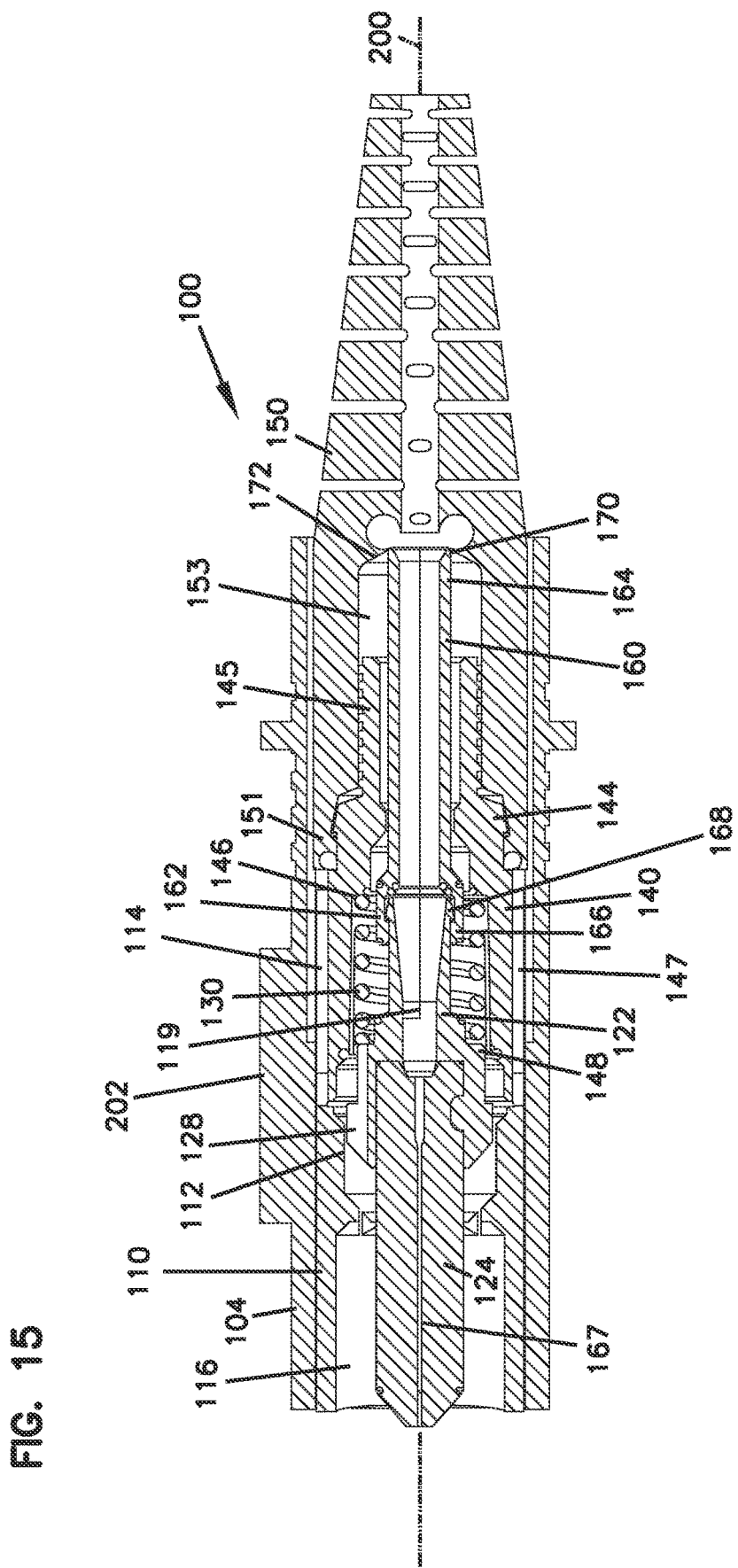
FIG. 15 is a cross-sectional view of the connector shown in FIG. 1 with the hub/ferrule assembly pressed rearwardly.

In the completely assembled configuration, as shown in FIGS. 2-3 and 15, the longitudinal distance 182 along the longitudinal axis 200 between the anti-rotation seat 112 and the rear surface 146 of the rear housing 140 is greater than the distance 180 between the end 170 of the hub extension member 160 to the surface 172 of the boot 150. In this state, it is not possible to push the ferrule 124 and the hub 122 along the longitudinal axis 200 back into the cavity 114 far enough to allow the anti-rotation portion 128 of the hub 122 to completely clear the anti-rotation seat 112 of the front housing 110.

This is illustrated in the completely assembled connector 100 of FIG. 15, wherein the ferrule 124 and the hub 122 are pushed back into the cavity 114 until the end 170 of the hub extension member 160 bottoms out against the surface 172 of the boot 150. The hub 122 and the ferrule 124 cannot travel any farther back along the longitudinal axis 200. In this position, the anti-rotation portion 128 of the hub 122 cannot completely clear the anti-rotation seat 112 of the front housing 110, thereby preventing rotation of the hub 122 and ferrule 124 about the longitudinal axis 200.

Therefore, in the fully assembled configuration of the connector 100, neither a pushing force applied to the ferrule 124 nor a pulling force applied to the cable attached to the connector 100 and translated through the optical fiber to the ferrule 122 can cause the anti-rotation portion 128 to completely clearing the anti-rotation seat 112. This prevents rotation of the ferrule 124, thereby assuring that a fully assembled connector 100 will not become un-tuned. Resulting connector 100 is tuned with respect to the exterior structure matable with an adapter of the type in U.S. Pat. No. 5,317,663. The configuration of the connector 100 is such that it is keyed so that it can only be received in the adapter in one orientation.

The advantages embodied in connectors made in accordance to the invention are applicable to a variety of fiber optic cable and connector types. The invention is particularly convenient for smaller cables, such as, for example, 0.900-millimeter cable, which does not include strength reinforcing members. Pulling rearwardly on the cable may pull the ferrule rearwardly, against the spring, but the hub will not disengage from the housing, thereby maintaining the tuned state of the connector.

Although the hub extension member 160 is illustrated as being separate from the hub 122, in alternative embodiments the hub can be elongated to form an integral extension (see U.S. Pat. No. 6,629,782 as an example, the entirety of which is hereby incorporated by reference) that extends towards the boot 150. Other configurations are possible.

Figure 18:
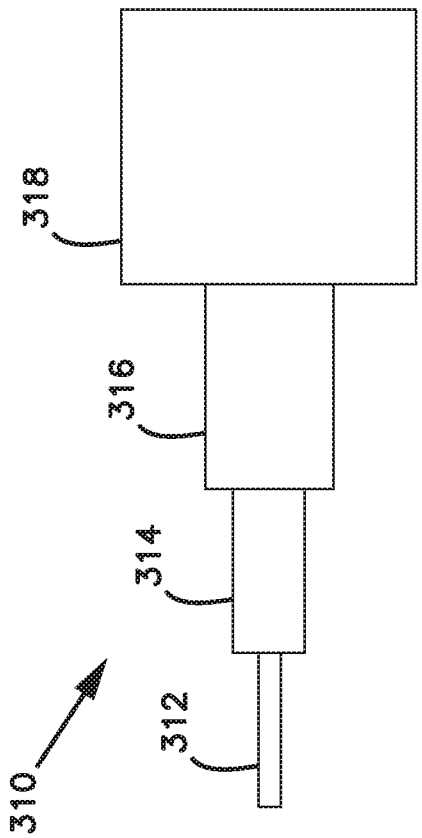
FIG. 18 is an exemplary schematic of a fiber optic cable construction in accordance with principles of the present disclosure.

FIG. 18 is an exemplary fiber optic cable 310 comprising a core 312 having an outer diameter of, for example, ten microns. The core 312 is the thin glass center of the fiber where the light travels. The core 312 is surrounded by a cladding 314 which is an outer optical material (e.g., glass) that reflects the light back into the core. The cladding typically has an outer diameter of about 125 microns. The core 312 and the cladding 314 constitute the inner optical fiber. A coating 316 that surrounds the cladding 314 protects the fiber from damage and moisture. The coating 316 typically has an outer diameter of, for example, about 250 microns. A tube covering 318 having an outer diameter of, for example, about 900 microns is applied over the coating 316 and further protects the fiber. This can also be referred to as upjacketing. The fiber optic cable 310 may be of the type without reinforcing strength members, although alternatives are possible.

Figure 19:
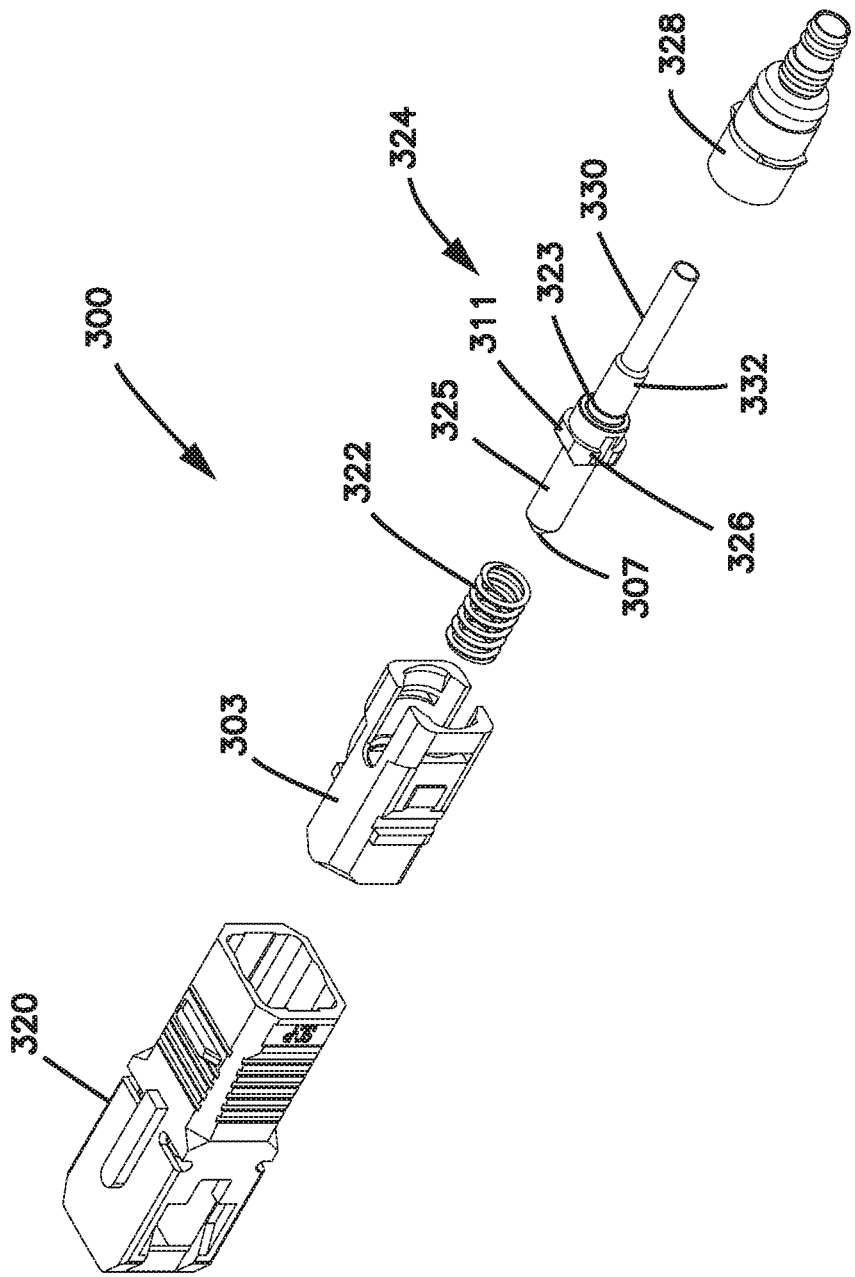
FIG. 19 is an exploded view of another example fiber optic connector in accordance with the principles of the present disclosure.

FIG. 19 is an exploded view of another example fiber optic connector 300 (e.g., SC-type connector, LC-type connector, MPO, etc.). The fiber optic connector 300 includes a main connector body 320 (e.g., outer key member) having a standard SC-style form factor. The fiber optic connector 300 also includes a spring 322 for biasing a ferrule assembly 324 including a ferrule 325 and a hub 326 in a forward direction such that the hub 326 seats within the main connector body 320. The fiber optic connector 300 further includes a front housing 303 and a rear housing 328 that retains the spring 322 within the front housing 303. The ferrule 325 can have a distal end 307 and a proximal end 309 (see FIG. 20). The proximal end 309 of the ferrule 325 can be mounted to a front end 311 of the hub 326. The ferrule 325 can define a fiber passage 313 (see FIG. 20) that is concentric with a central axis 315 (see FIG. 20) of the ferrule 325. The fiber passage 313 can extend through the ferrule 325 from the proximal end 309 to the distal end 307.

The fiber optic connector 300 further includes an epoxy tube (e.g., hub extension member, lead-in tube) 330. The epoxy tube 330 has similar features to the hub extension member 160 described above.

Figure 20:
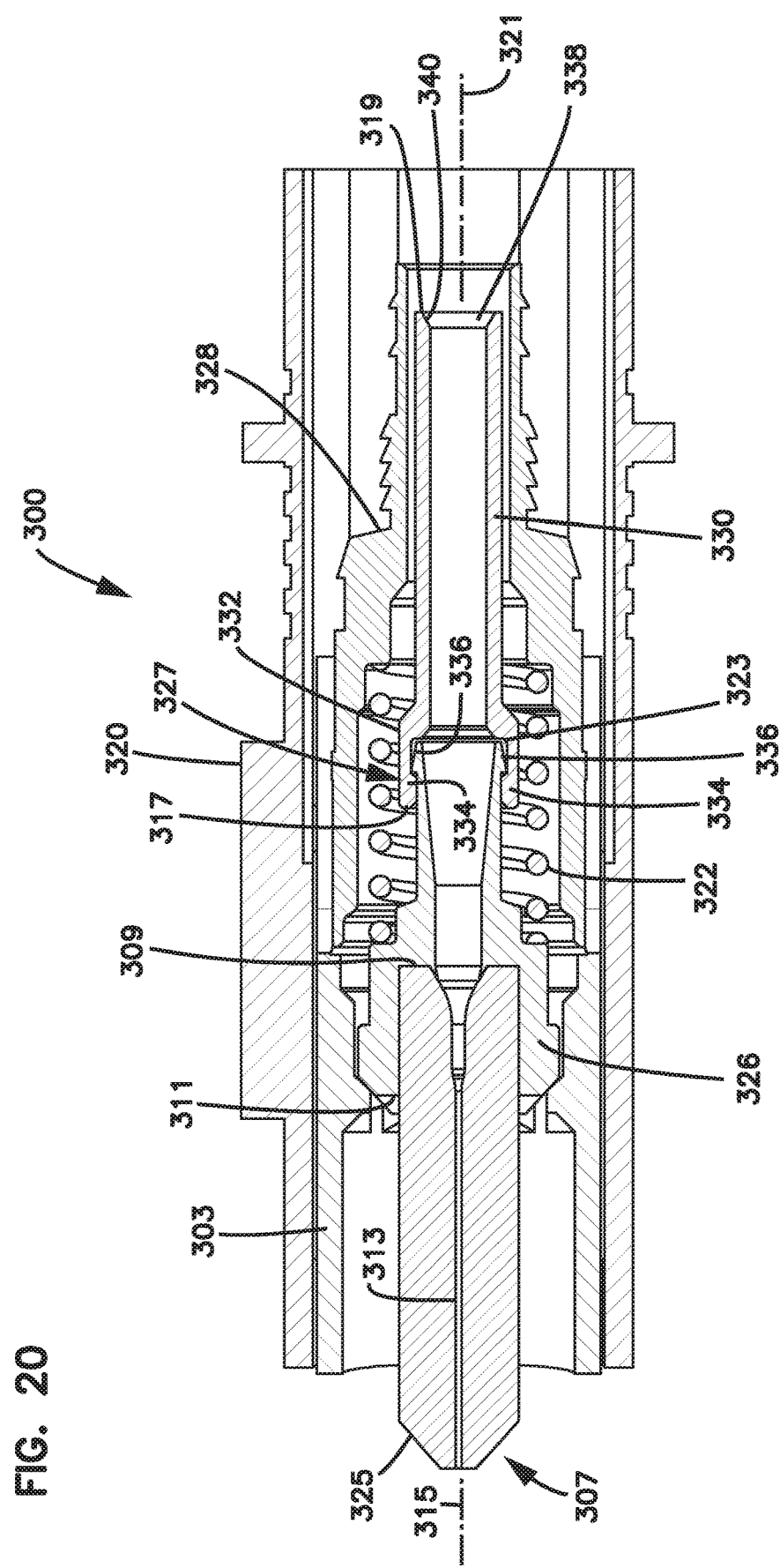
FIG. 20 is a cross-sectional view of the fiber optic connector shown in FIG. 19 in a fully assembled state.
Figure 21:
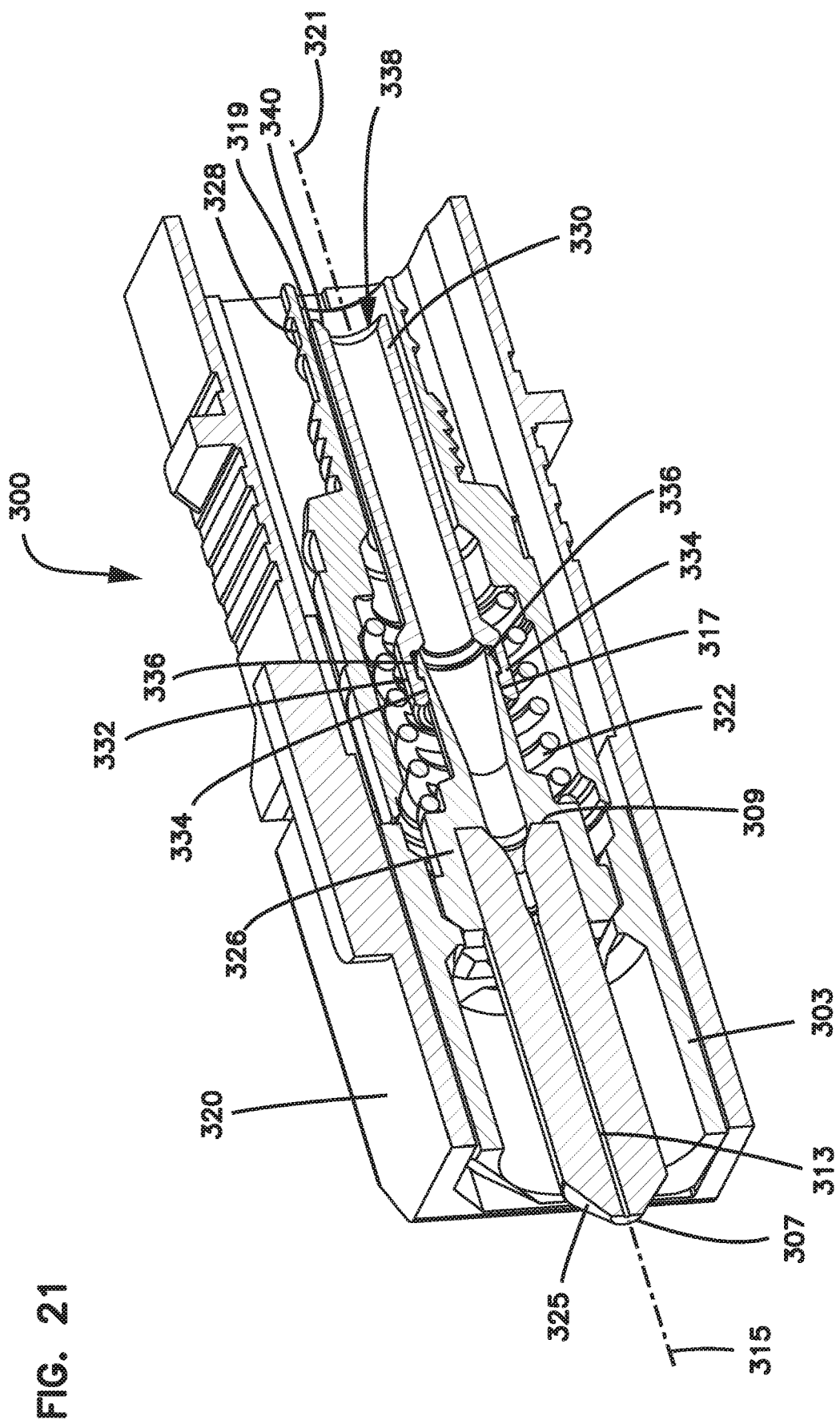
FIG. 21 is a perspective view of the fiber optic connector shown in FIG. 20.

Referring to FIGS. 20-21, the epoxy tube 330 can have a first end 317 and a second end 319. The epoxy tube 330 can define a tube axis 321 that is linear. The tube axis 321 can align with the central axis 315 of the ferrule 325. That is, the tube axis 321 and the central axis 315 can be concentric or coaxially aligned. The first end 317 of the epoxy tube 330 may be mounted externally to a rear end 323 of the hub 326 to define an interface 327 (e.g., joint). The interface 327 may include an enlarged front portion 332 of the epoxy tube 330 that includes an arm 334 to engage tabs 336 of the hub 326 to couple the epoxy tube 330 to the hub 326. The epoxy tube 330 mounts over the hub 326 to form the interface 327 that can be a loosely fit interface while still not allowing the epoxy tube 330 to be removed. That is, the epoxy tube 330 may be angled at the interface 327 and continuously remain linear from the first end 317 of the epoxy tube 330 to the second end 319 of the epoxy tube 330. As such, while the epoxy tube 330 is adapted to be rotatable about the hub 326, the epoxy tube 330 is not configured to curve or bend but maintains a straight tube axis 321.

In certain examples, the interface 327 of the epoxy tube 330 and the hub 326 may be made by a snap fit connection, although alternatives are possible. In certain examples, the interface 327 of the epoxy tube 330 with the hub 326 may be made by a press fit, although alternatives are possible. In certain examples, the interface 327 of the epoxy tube 330 with the hub 326 may be made by a friction fit connection, although alternatives are possible. In certain examples, the interface 327 of the epoxy tube 330 with the hub 326 may be made by an interference fit, although alternatives are possible. In certain examples, the interface 327 of the epoxy tube 330 with the hub 326 may be made by adhesive, such as an epoxy adhesive, although alternatives are possible.

The interface connection between the epoxy tube 330 and the hub 326 allows the epoxy tube 330 to be configured with a float. That is, the epoxy tube 330 may not be rigidly attached to the hub 326 to prevent any range of motion. The epoxy tube 330 may be adapted to float in order to help prevent forces placed on the epoxy tube 330 from side loading to be transferred to the hub 326. Although the epoxy tube 330 may be configured loosely, the adhesive or epoxy does not leak.

Turning to FIGS. 22-23, the epoxy tube 330 may be arranged and configured to move about an arc of rotational circular motion or movement. The epoxy tube 330 may move about an arc of rotational circular motion through an angle θ at the interface 327 relative to the central axis 315 while allowing the tube axis 321 of the epoxy tube 330 to remain linear from the first end 317 of the epoxy tube 330 to the second end 319 of the epoxy tube 330. The tube axis 321 and the central axis 315 can be aligned with centerline axis $A_a$. As depicted in FIG. 23, the epoxy tube 330 can be rotated or pivoted to define a pivoted axis $A_b$ that can be adapted to move about an arc of rotational circular motion through the angle θ relative to the central axis 315/centerline axis $A_a$ while allowing the tube axis 321 of the epoxy tube 330 to remain linear from the first end 317 of the epoxy tube 330 to the second end 319 of the epoxy tube 330.

Figure 25:
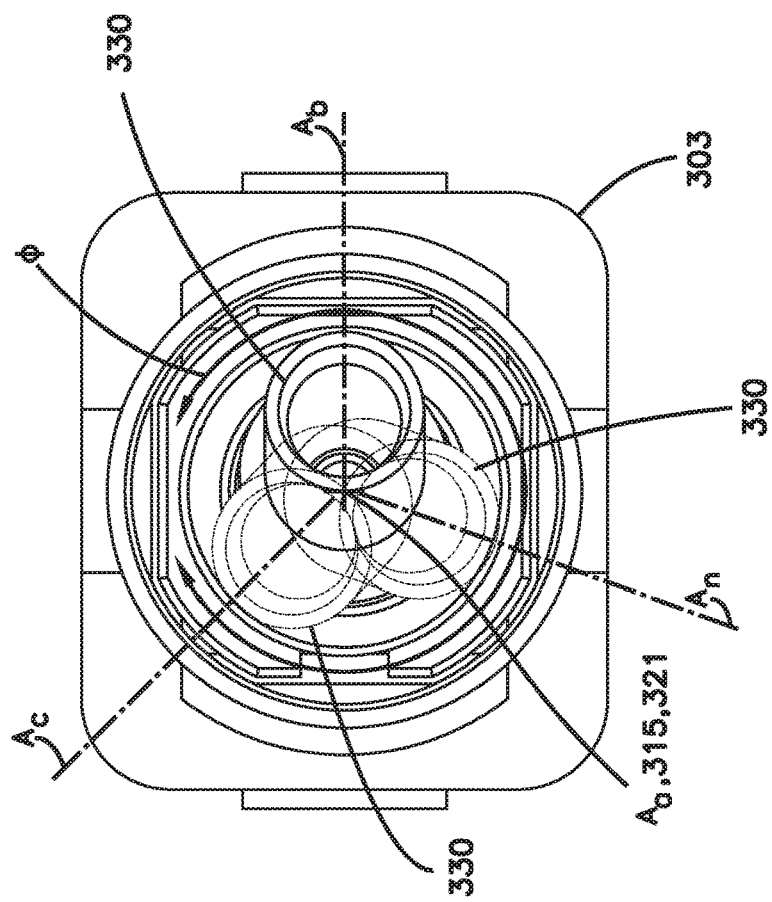
FIG. 25 is an end view of the fiber optic connector shown in FIG. 23.
Figure 24:
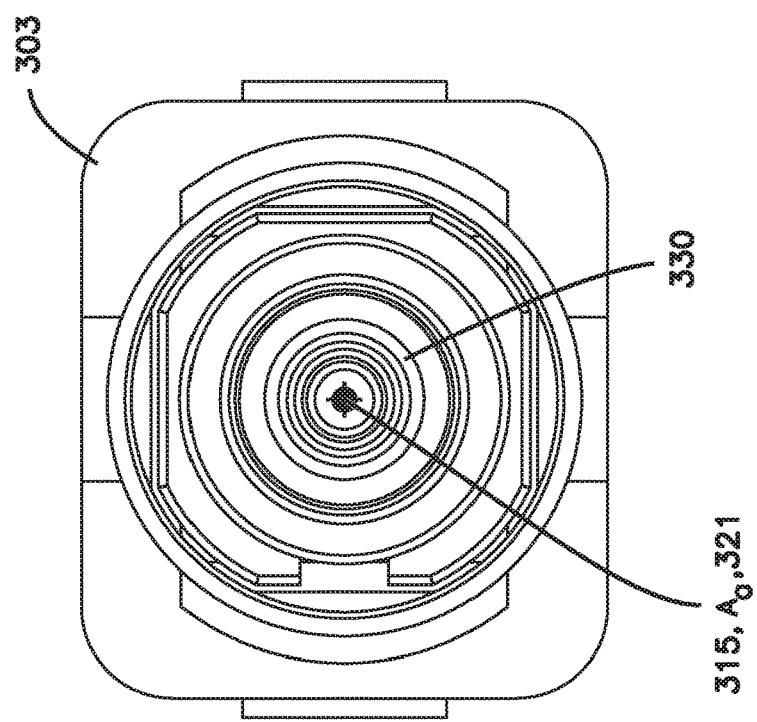
FIG. 24 is an end view of the fiber optic connector shown in FIG. 22.

Referring to FIGS. 24-25, end views of the epoxy tube 330 is depicted to show range of motion that the epoxy tube 330 is adapted to rotate. The epoxy tube 330 may be configured to move through any angle ϕ relative to the central axis 315/centerline axis $A_a$ about 360 degrees (e.g., a circle). When the epoxy tube 330 is pivoted or moved, the axis can be generally represented by axis $A_n$, $A_b$, $A_c$. As the epoxy tube 330 is moved about an arc of rotational circular movement, the tube axis 321 remains linear relative to the central axis 315/centerline axis $A_a$. That is, the epoxy tube 330 does not bend or flex during rotational circular movement such that the tube axis 321 maintains linear relative to the central axis 315/centerline axis $A_a$ from the first end 317 of the epoxy tube 330 to the second end 319 of the epoxy tube 330.

In certain examples, the epoxy tube 330 can move about an arc of rotational circular motion through an angle within a range of 1° to 11° relative to the central axis 315 while allowing the tube axis 321 of the epoxy tube 330 to remain linear from the first end 317 of the epoxy tube 330 to the second 319 of the epoxy tube 330, although alternatives are possible. In certain examples, the epoxy tube 330 can move about an arc of rotational circular motion through an angle within a range of 2° to 5° relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 can move about an arc of rotational circular motion through an angle within a range of 5° to 10° relative to the central axis 315 while allowing the tube axis 321 of the epoxy tube 330 to remain linear from the first end 317 of the epoxy tube 330 to the second end 319 of the epoxy tube 330, although alternatives are possible.

Typically, the arc of rotational circular motion moves through an angle of no more than 11 degrees relative to the central axis 315 while allowing the tube axis 321 of the epoxy tube 330 to remain linear from the first end 317 of the epoxy tube 330 to the second end 319 of the epoxy tube 330. Often, the arc of rotational circular motion moves through an angle of no more than 5 degrees relative to the central axis 315 while allowing the tube axis 321 of the epoxy tube 330 to remain linear from the first end 317 of the epoxy tube 330 to the second end 319 of the epoxy tube 330. Usually, the arc of rotational circular motion moves through an angle of no more than 10 degrees relative to the central axis 315 while allowing the tube axis 321 of the epoxy tube 330 to remain linear from the first end 317 of the epoxy tube 330 to the second end 319 of the epoxy tube 330.

In certain examples, the epoxy tube 330 may move about an arc of rotational circular motion through an angle of at least 1 degree relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 2 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 3 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 4 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 5 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 6 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 7 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 8 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 9 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 10 degrees relative to the central axis 315 while allowing the tube axis 321 of the epoxy tube 330 to remain linear from the first end 317 of the epoxy tube 330 to the second end 319 of the epoxy tube 330, although alternatives are possible. In certain examples, the epoxy tube 330 may move about an arc of rotational circular motion through an angle of at least 11 degrees relative to the central axis 315 while allowing the tube axis 321 of the epoxy tube 330 to remain linear from the first end 317 of the epoxy tube 330 to the second end 319 of the epoxy tube 330, although alternatives are possible.

The epoxy tube 330 can be positioned within the rear housing 328 for guiding an optical fiber into the ferrule assembly 324. The epoxy tube 330 may have a flare 338 formed at the second end 319 thereof for guiding an optical fiber into the fiber optic connector 300. The flare 338 can be accommodated by chamfer 340 to help facilitate insertion of an optical fiber into the epoxy tube 330 when mounting the fiber optic connector 300 onto an optical fiber. In certain examples, the epoxy tube 330 may be made of a rigid plastic material, such as, but not limited to, polypropylene. That is, the epoxy tube 330 can be made with a material that may not be adapted to deform to allow the epoxy tube 330 to bend or flex. The epoxy tube 330 can be made with a rigid material that allows it to easily be pushed over the hub 326 without deforming.

Figure 26:
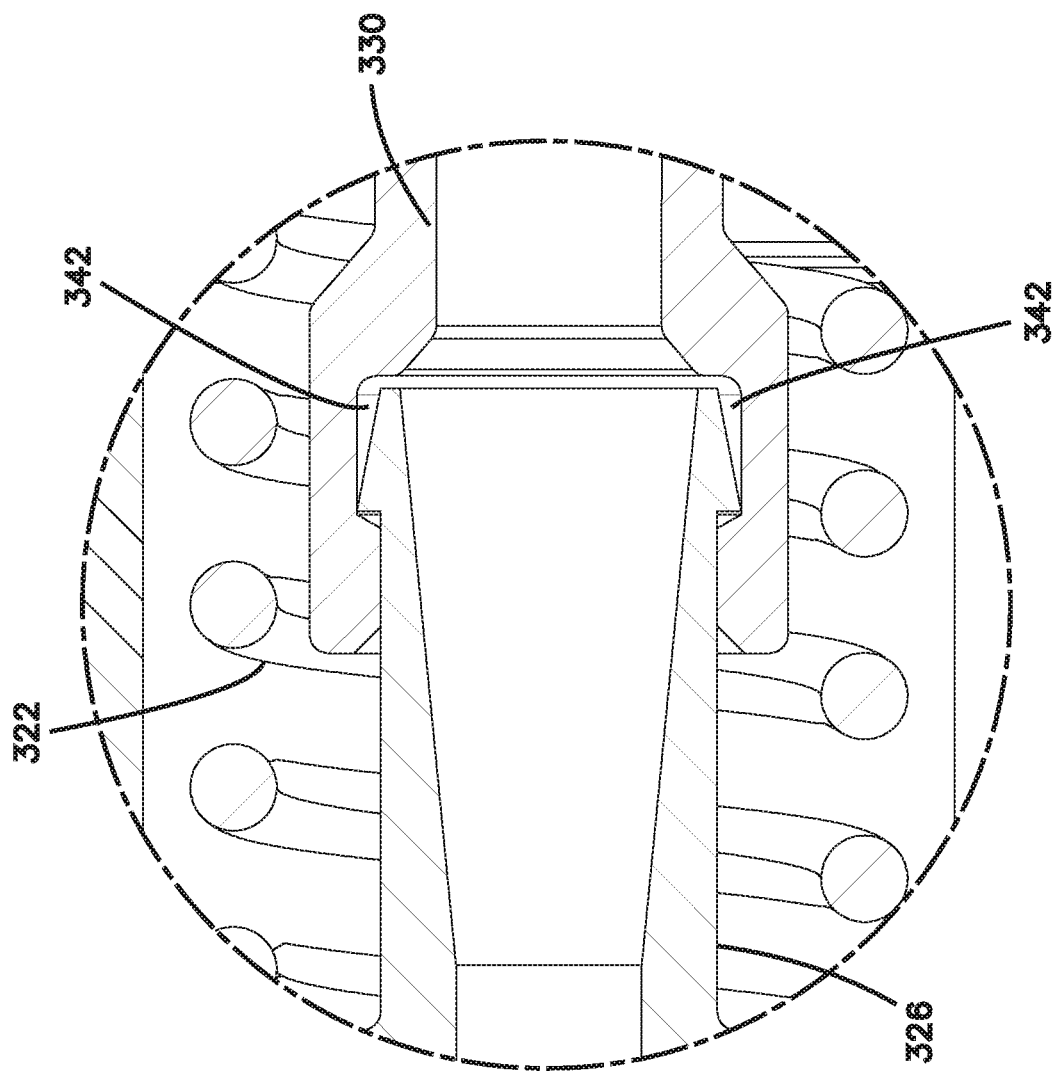
FIG. 26 is an enlarged view of the epoxy tube and hub shown in FIG. 20.

Turning to FIG. 26, an enlarged view of the epoxy tube 330 is shown attached to the hub. The interface 327 of the epoxy tube 330 and the hub 326 may include a connection in which air gaps 342 are defined to allow the epoxy tube 330 to pivot.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A fiber optic connector assembly, comprising:
   a ferrule assembly including a ferrule and a hub, the ferrule having a distal end and a proximal end, the proximal end of the ferrule being mounted to a front end of the hub, the ferrule defining a fiber passage that is concentric with a central axis of the ferrule, the fiber passage extending through the ferrule from the proximal end to the distal end; and
   a tube having a first end and a second end, the tube defining a tube axis that is linear, the tube axis aligning with the central axis of the ferrule, the first end of the tube mounted by a snap-fit connection externally to a rear end of the hub to define an interface, wherein the interface includes an enlarged front portion of the tube that includes an arm which engages over tabs defined by the hub to couple the tube to the hub;
   wherein, once the tube is mounted on the hub, the interface between the tube and the hub allows the tube to be non-rigidly attached to the hub and allows the tube to be configured with a float such that the tube is configured to move about an arc of rotational circular motion, the arc of rotational circular motion moving through an angle of at least 5 degrees relative to the central axis while allowing the tube axis of the tube to remain linear from the first end of the tube to the second end of the tube, wherein the interface between the tube and the hub includes a connection that defines an air gap between the tube and the hub to allow the tube to move about the arc of rotational circular motion.

2. The fiber optic connector assembly of claim 1, wherein the tube is rotatable about the hub.

3. The fiber optic connector assembly of claim 1, wherein the tube is made from a polymeric material.

4. The fiber optic connector assembly of claim 3, wherein the polymeric material is a polypropylene.

5. The fiber optic connector assembly of claim 1, wherein the tube is rigid.

6. The fiber optic connector assembly of claim 1, wherein the arc of rotational circular motion moves through an angle of at least 10 degrees.

7. The fiber optic connector assembly of claim 1, wherein the arc of rotational circular motion moves through an angle of at least within 1 degree to 11 degrees, inclusive.

8. The fiber optic connector assembly of claim 1, wherein the fiber passage at the distal end of the ferrule is configured to receive injected adhesive in order to pot an optical fiber provided in the fiber passage.

9. The fiber optic connector assembly of claim 1, further comprising a fiber optic connector including a connector body and a boot, the boot having a distal end portion that is coupled to a proximal end portion of the connector body.

10. A fiber optic connector and cable assembly comprising:

a fiber optic connector including a connector body and a boot, the boot having a distal end portion that is coupled to a proximal end portion of the connector body;

a fiber optic cable including an optical fiber, an outer jacket that surrounds the optical fiber, and a tensile reinforcing structure that provides tensile reinforcement to the fiber optic cable, the optical fiber extending through the boot towards the connector body, and the tensile reinforcing structure being anchored relative to the boot;

a ferrule assembly including a ferrule and a hub, the ferrule having a distal end and a proximal end, the proximal end of the ferrule being mounted to a front end of the hub, the ferrule defining a fiber passage that is concentric with a central axis of the ferrule, the fiber passage extending through the ferrule from the proximal end to the distal end; and a tube having a first end and a second end, the tube defining a tube axis that is linear and concentric with the central axis of the ferrule, the first end of the tube mounted by a snap-fit connection externally to a rear end of the hub to define an interface, wherein the interface includes an enlarged front portion of the tube that includes an arm which engages over tabs defined by the hub to couple the tube to the hub;

wherein, once the tube is mounted on the hub, the interface between the tube and the hub allows the tube to be non-rigidly attached to the hub and allows the tube to be configured with a float such that the tube is configured to move about an arc of rotational circular motion, the arc of rotational circular motion moving through an angle of at least 5 degrees relative to the central axis while allowing the tube axis of the tube to remain linear from the first end of the tube to the second end of the tube, wherein the interface between the tube and the hub includes a connection that defines an air gap between the tube and the hub to allow the tube to move about the arc of rotational circular motion.

11. The fiber optic connector and cable assembly of claim 10, wherein the tube is made from a polymeric material.

12. The fiber optic connector and cable assembly of claim 11, wherein the polymeric material is a polypropylene.

13. The fiber optic connector and cable assembly of claim 10, wherein the tube is rigid.

14. The fiber optic connector and cable assembly of claim 10, wherein the arc of rotational circular motion moves through an angle of at least 10 degrees.

15. The fiber optic connector and cable assembly of claim 10, wherein the arc of rotational circular motion moves through an angle of at least within 1 degree to 11 degrees, inclusive.

* * * * *